United States Patent [19]

Mishiro

[11] Patent Number: 4,697,117
[45] Date of Patent: Sep. 29, 1987

[54] ROTARY ULTRASONIC MOTOR

[75] Inventor: Shoji Mishiro, Kanagawa, Japan

[73] Assignee: Taga Electric Co., Ltd., Tokyo, Japan

[21] Appl. No.: 930,429

[22] Filed: Nov. 14, 1986

[30] Foreign Application Priority Data

Nov. 27, 1985 [JP] Japan .................... 60-266617
Dec. 24, 1985 [JP] Japan .................... 60-291732
Jan. 23, 1986 [JP] Japan .................... 61-12823

[51] Int. Cl.$^4$ .................................... H01L 41/08
[52] U.S. Cl. .................... 310/323; 310/325; 310/328
[58] Field of Search .................... 310/323, 325, 328

[56] References Cited

U.S. PATENT DOCUMENTS

| 4,210,837 | 7/1980 | Vasiliev et al. ............ 310/323 |
| 4,580,073 | 4/1986 | Okumura et al. ............ 310/328 |
| 4,620,121 | 10/1986 | Mishiro ............ 310/323 |
| 4,642,509 | 2/1987 | Kumada ............ 310/328 X |

FOREIGN PATENT DOCUMENTS

55-125052 9/1980 Japan .
0178988 10/1984 Japan .................... 310/328
0148385 8/1985 Japan .................... 310/323

Primary Examiner—Mark O. Budd
Attorney, Agent, or Firm—Oblon, Fisher, Spivak, McClelland & Maier

[57] ABSTRACT

A rotary ultrasonic motor equipped with an ultrasonic vibrator including an electrostrictive element which is polarized in the direction of its thickness and has a plurality of electrode pairs arrayed uniformly in the circumferential direction. The electrostrictive element is held and clamped between two metallic members, and grooves are formed in at least one metallic member along division lines corresponding in number to the electrode pairs of the electrostrictive element, thereby constituting the ultrasonic vibrator. And a rotor having an output shaft at the center of rotation thereof is kept in pressed contact with the output end of the ultrasonic vibrator. In this motor, the rotor is driven by composite vibration, and an improved function is achievable to prevent mutual interference that may otherwise be caused by a circumferential stress at the axial vibration of the ultrasonic vibrator.

5 Claims, 21 Drawing Figures

ROTARY ULTRASONIC MOTOR

FIELD OF THE INVENTION AND RELATED ART STATEMENT

The present invention relates to an apparatus applying ultrasonic vibration and, more particularly, to a rotary ultrasonic motor which employs an ultrasonic vibrator for generating composite vibration in any of desired directions.

Out of the known ultrasonic vibrators, there are generally used a Langevin type vibrator which resonates with a disk-shaped electrostrictive element held between two metallic members, and a $\pi$-type vibrator composed of a ferrite magnetostrictive material in the shape of a cylinder or $\pi$.

With regard to the direction of vibration, there exist a vertical vibrator vibratable in its axial direction and a torsional vibrator which generates torsional vibration symmetrically with respect to its shaft. Each of the above vibrators is of a unidirectional structure whose vibration is generated merely in its axial or torsional direction.

An exemplary ultrasonic motor employing such unidirectional vibrator is disclosed in Japanese Patent Laid-open No. 55 (1980)-125052, wherein an axial vibrator is used and a vibratory element is attached to its output end. And in a state where a normal line to the junction surface of a moving member such as a rotor is slightly inclined to the axis of the vibrator, its vibratory element is pressed to the rotor. Then the fore end of the vibratory element is actuated to generate elliptic vibration to drive the rotor frictionally. However, in the ultrasonic motor with such vibratory element, there occurs considerable abrasion in both contact regions of the vibratory element and the rotor with another disadvantage that loud noise is induced.

Figure 21:
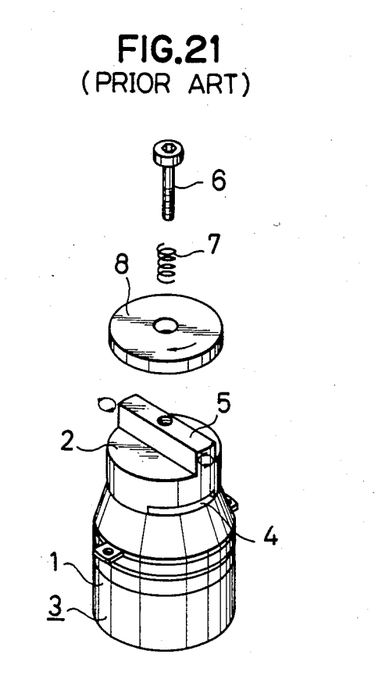
FIG. 21 is an exploded perspective view of a conventional example.

Meanwhile, as illustrated in FIG. 21, there is known another type different from the above ultrasonic motor. In this example, a torsion transducer 2 is clamped integrally to a vertical vibratory element 1 to constitute a vibrator 3. A wide slit 4 is formed on one side of the torsion transducer 2, while a beam-shaped projection 5 is formed on the other side thereof at a certain angle to the slit 4. And a rotor 8 is attached with pressure to the torsion transducer 2 via a bolt 6 and a helical spring 7. When vertical vibration generated from the vertical vibratory element 1 is applied to the torsion transducer 2, elliptic vibration is generated in the direction of an arrow at the fore end of the beam-shaped projection 5 of the torsion transducer 2, so that the rotor 8 kept in contact therewith is rotated clockwise as indicated by a thick arrow. Thus, a high-efficiency ultrasonic motor is constituted in the manner mentioned above.

However, there still exists a drawback in such means that the ellipticity of the elliptic vibration induced at the output end of the ultrasonic motor is not controllable since the ellipticity is determined univalently by the shape of the torsion transducer 2. Consequently, it becomes impossible to reduce the abrasion of both friction surfaces of the rotor 8 and the beam-shaped projection 5 or to attain a high driving efficiency with a maximum torque by controlling the ellipticity to a value optimal for frictional driving. Furthermore, another disadvantage is unavoidable that the rotational direction of the rotor 8 is not controllable either since such direction is determined also uniformly by the shape of the torsion transducer 2.

OBJECTS AND SUMMARY OF THE INVENTION

It is a first object of the present invention to provide a rotary ultrasonic motor which is capable of driving a rotor by composite vibration while controlling both the ellipticity of elliptic vibration at the output end of an ultrasonic vibrator and the direction of such output-end vibration.

A second object of the invention resides in providing a rotary ultrasonic motor adapted to prevent mutual interference that may otherwise be caused by a circumferential stress at the axial vibration of an ultrasonic vibrator.

And a third object of the invention is to provide a rotary ultrasonic motor wherein the vibration distribution at the output end of an ultrasonic vibrator can be rendered uniform even when the output end of the ultrasonic vibrator is enlarged in diameter to increase the driving force applied to the rotor.

In order to accomplish the objects mentioned above, the present invention is equipped with an ultrasonic vibrator including an electrostrictive element which is polarized in the direction of its thickness and has a plurality of electrode pairs arrayed at equal intervals in the circumferential direction. The electrostrictive element is held and clamped between two metallic members, and grooves are formed in at least one metallic member, with the exception of its end region, along division lines corresponding in number to the electrode pairs of the electrostrictive element. An intermediate portion of such ultrasonic vibrator is anchored to a frame, and a disk-shaped rotor kept in pressed contact with the output end of the ultrasonic vibrator is rotatably attached to the frame and has an output shaft at the center thereof. The electrodes are connected in parallel to each other alternately in the circumferential direction and are fed with AC voltages of controlled relative phase, AC voltages of controlled relative amplitude or a combination thereof. As a result, linear, circular or elliptic vibration can be generated in the ultrasonic vibrator in any desired direction on the plane orthogonal to the direction of division of the electrodes, whereby the ellipticity in the elliptic vibration is also rendered controllable. And the mutual interference that may otherwise be caused by the circumferential stress at the axial vibration can be prevented due to the existence of grooves in the metallic members which clamp the electrostrictive element integrally therebetween.

DESCRIPTION OF PREFERRED EMBODIMENTS

Hereinafter a first embodiment of the present invention will be described with reference to FIGS. 1 through 10. A frame 9 serving as a stationary part is shaped to be cylindrical by a combination of a main frame 10 and a lid 11. A bearing 13 is disposed at the center of an end face 12 of the main frame 10, and five set screws 14 are arrayed at equal intervals on its open end face. In the main frame 10, there are five stepped portions 16 at equal intervals with screw holes 15 formed therein toward the open end face. Meanwhile the lid 11 has lock holes 18 to permit insertion of lock screws 17 therein for locking the main frame 10, and a sleeve-like projection 20 having a fitting step 19 at its fore end is formed at the inner center of the lid 11. And a bearing 21 is attached inside of the projection 20. Shaft portions 23 and 24 serving as an output shaft of a rotor 22 are attached respectively to the aforesaid bearings 13 and 21. The rotor 22 has a disk 25 whose one surface is shaped to be planar.

Figure 1:
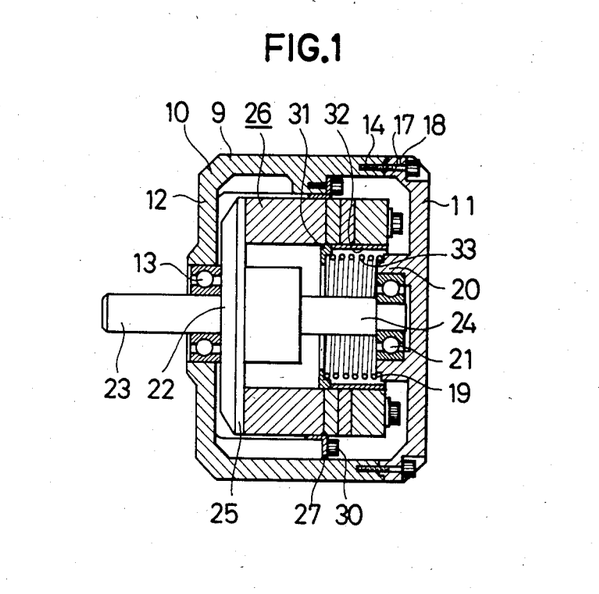
FIG. 1 is a vertical sectional side view of the entire structure of a first embodiment according to the present invention.
Figure 2:
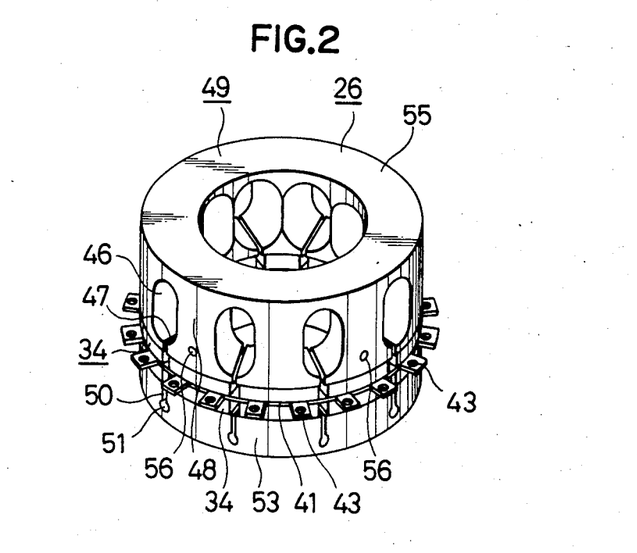
FIG. 2 is a perspective view of an ultrasonic vibrator.
Figure 3:
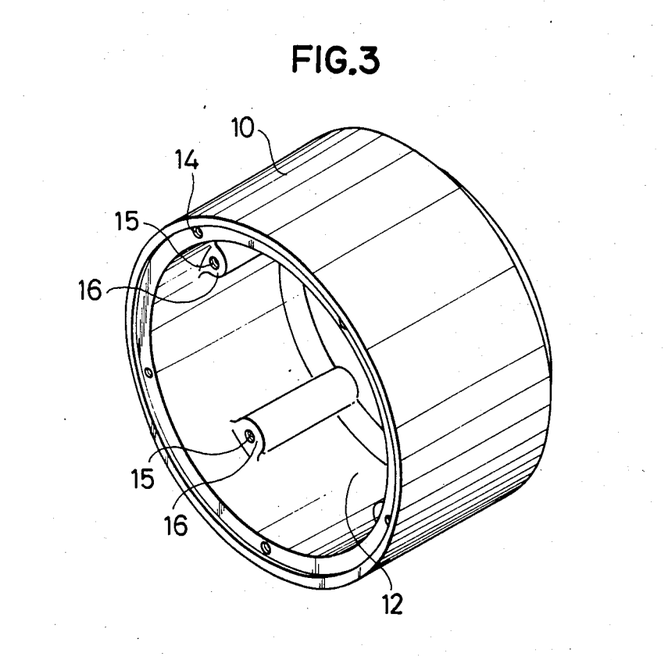
FIG. 3 is a perspective view of a main frame.
Figure 4:
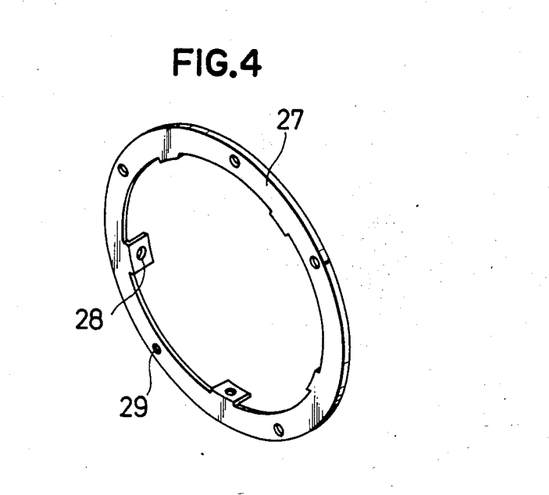
FIG. 4 is a perspective view of a set ring.

An ultrasonic vibrator 26 is incorporated in the frame 9. And there is provided a set ring 27 where five tongues 28 are arrayed at equal intervals to be attached to the periphery of the ultrasonic vibrator 26, and holes 29 are formed between the tongues 28 correspondingly to the screw holes 15 of the stepped portions 16. The ultrasonic vibrator 26 is attached to the frame 9 by means of holding screws 30 through the set ring 27 in such a manner as to be fixed in the rotational direction but to be shiftable in the axial direction by a length corresponding to the elastic deformation of the set ring 27. A flange 31 is provided fixedly in an intermediate portion of the ultrasonic vibrator 26, and a cylindrical insulator member 32 is secured to one side of the flange 31. A helical compression spring 33 is interposed between the flange 31 and the fitting step of the projection 20, so that the ultrasonic vibrator 26 is elastically urged toward the disk 25 of the rotor 22.

Figure 5:
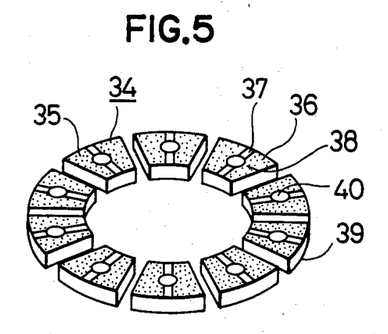
FIG. 5 is a perspective view of an electrostrictive element.

In the ultrasonic vibrator 26 having the following structure, the electrostrictive element 34 of FIG. 5 comprises ten sector blocks 35 arrayed annularly in the circumferential direction. Each sector block 35 has a pair of electrodes 38 divided by an insulator portion 37 one one surface of the electrostrictive piece 36 polarized in the direction of its thickness, and also has a common electrode 39 formed on the other surface. And a bore 40 is formed at the center of each sector block 35. Ten of such sector blocks 35 are combined with one another along the circumference to constitute a single electrostrictive element 34.

Figure 6:
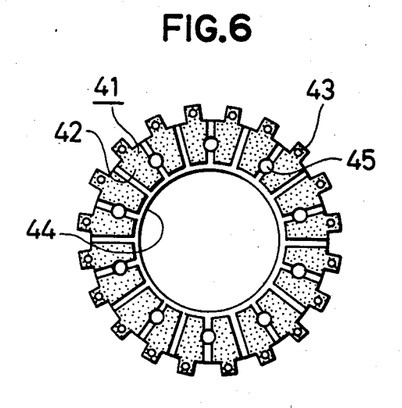
FIG. 6 is a plan view of an electrode plate.

FIG. 6 shows an electrode plate 41, where electrode regions 42 are formed correspondingly to the electrodes 38 of the electrostrictive element 34, and a terminal 43 is formed in each of the electrode regions 42. The electrode plate 41 has a center opening 44 and bores 45 corresponding to the bores 40 of the electrostrictive element 34. The electrode plate 41 is a printed circuit board composed of a thin glass epoxy plate with copper foil stuck to its two surfaces.

Figure 7:
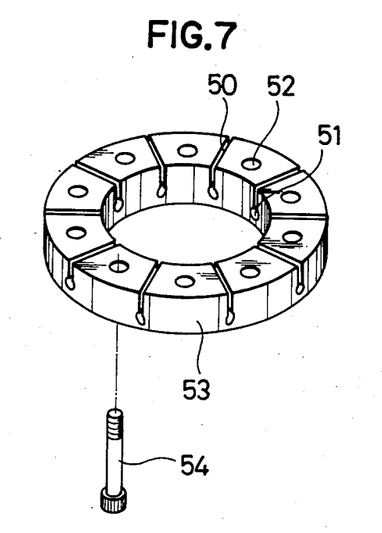
FIG. 7 is an exploded perspective view of a metallic member and a lock screw.

The electrostrictive elements 34 are joined to the two surfaces of the electrode plate 41, and a first metallic member 49 is connected to one electrostrictive element 34 while a second metallic member 53 is connected to the other electrostrictive element 34. The first and second metallic members 49 and 53 are both shaped to be cylindrical. More specifically, the first metallic member 49 has grooves 46 and slits 47 coincident with the division angle of the sector block 35. Such grooves 46 and slits 47 are combined with each other to form legs 48, and an unshown female screw is formed at the center of each leg 48. Meanwhile the second metallic member 53 has slits 50 coincident with the division angle of the sector block 35, circular holes 51 communicating with the slits 50, and also apertures 52 at positions coincident with the female screws formed in the first metallic member 49.

The two electrostrictive elements 34 with the electrode plate 41 sandwiched therebetween are supported by the first metallic member 49 and the second metallic member 53, which are clamped together by means of lock screws 45 to constitute the aforesaid ultrasonic vibrator 26. The lock screws 54 are driven into the female screws of the first metallic member 49 through the apertures 52 of the second metallic member 53.

The other end portion of the first metallic member 49 without any slit 47 serves as a ring-shaped output end 55. And terminal lock holes 56 are formed in the peripheries of the legs 48 so as to connect lead wires from a common electrode. And to the terminals 43 of the electrode plate 41 are connected two lead wires 57 and 58 which connect the terminals 43 in parallel with each other alternately in the circumferential direction. And the lead wires 57 and 58 are further connected to lead terminals 59 and 60 respectively.

Figure 9:
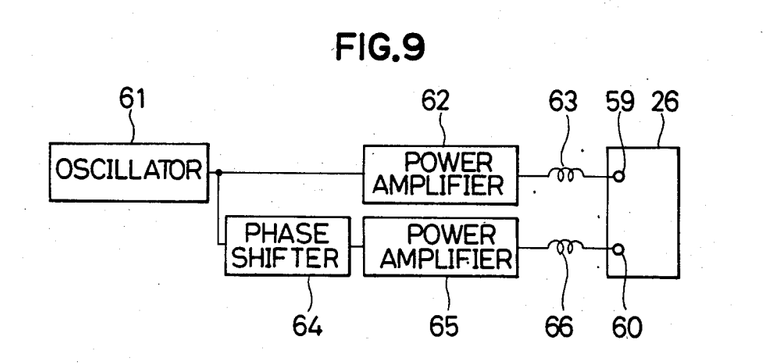
FIG. 9 is a circuit diagram of a driving power supply.

FIG. 9 shows a driving power supply for an ultrasonic motor. An oscillator 61 generates vibration at a frequency of resonance in the axial or flexural direction of the ultrasonic vibrator 26 and is connected to the lead terminal 59 of the ultrasonic vibrator 26 through a power amplifier 62 and a conjugate matching inductor 63. The oscilator 61 is connected to the another lead terminal 60 through a phase shifler 64 a power amplifire 65 and a conjugate matching inductor 66.

In the above constitution, a driving control voltage is applied from a driver circuit to the electrostrictive element 34. The principle of operation of this embodiment will now be described below with reference to FIG. 10, particularly regarding the important function of the grooves 46 and the slits 47 in the first metallic member 49 and that of the slits 50 and the circular holes 51 in the second metallic member 53.

Figure 10:
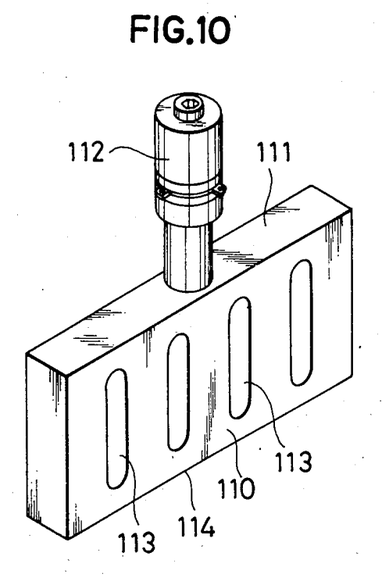
FIG. 10 is a perspective view illustrating the principle of operation.

A vibrator 112 is joined to the center of an axial end 111 of a wide horn 110, and a plurality of slits 113 are formed across the horn 110 with the exception of its axial end portion. An output end 114 of the wide horn 110 resonating axially inclusive of the vibrator 112 generates axial vibration with a uniform amplitude and phase over the entire width thereof. The slits 113 are formed for the purpose of preventing transverse interference that may otherwise be caused by the Poisson effect with respect to the adjacent region as well as to the node where the stress becomes maximum. A preferred transverse pitch of the slits 113 is considered to be less than λ/4 (where λ is a resonance wavelength). It is generally known that, due to the existence of such slits 113, uniform vibration is attainable when the transverse length of the wide horn 110 is in a range of 1.5 to 3λ, and this embodiment utilizes such principle of operation.

In this embodiment, the operation is performed in the following manner. A driving power supply capable of controlling the relative phase by a phase shifter 64 is connected between the common terminal attached to the first metallic member 49 and the lead terminals 59 and 60. First, the driving frequency of such power supply is adjusted to tune to the axial resonance frequency. And when the phase difference is reduced to zero, in-phase parallel driving is achieved so that, as shown in FIG. 8(d), the output end 55 vibrates in an axial resonance mode similarly to an ordinary vertical vibrator.

Suppose here that the first metallic member 49 is composed of an ordinary cylinder without having any such grooves and so forth. Then, if the transverse length of the axially oscillating vibrator exceeds λ/2 (when the diameter becomes greater in this example), the uniform vibration of the output end is impeded by the axial interference that is caused by the Poisson effect, as described previously in connection with FIG. 10. In this embodiment, however, such interference can be prevented due to the grooves 46 and the slits 47 formed in the first metallic member 49 up to its axial end, and also the divided electrostrictive elements 34, and the slits 50 and the circular holes 51 in the second metallic member 53.

Figure 8:
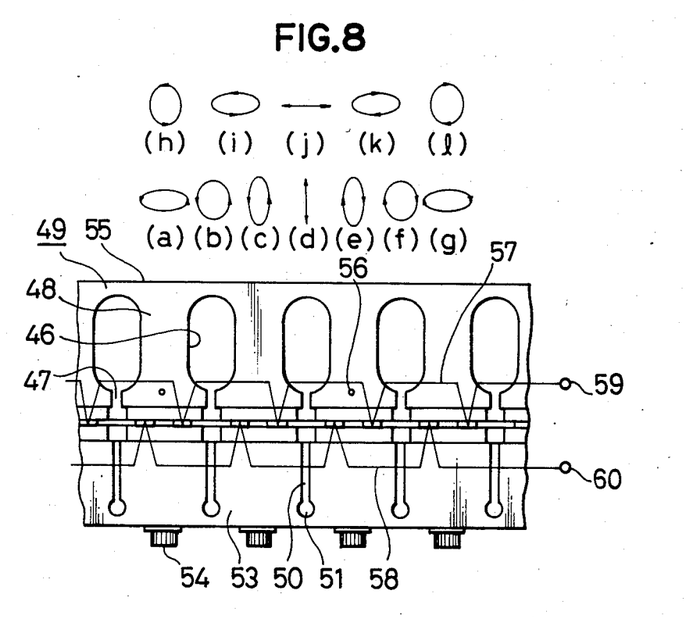
FIG. 8 is a side view of a peripheral portion developed linearly.

When the phase of the driving voltage applied to the lead terminal 59 is advanced with respect to the lead terminal 60, the output end 55 is so driven as to generate counterclockwise elliptic vibration with a major axis as shown in FIG. 8(c). And in accordance with further increase of such phase advance, the elliptic shape is changed to be axially shorter and orthogonally longer as shown in FIGS. 8 (b) and (a).

Similarly, when the phase of the driving voltage applied to the lead terminal 59 is lagged with respect to the lead terminal 60, the elliptic vibration is reversed to a clockwise direction. And in accordance with increase of the phase difference, the vibration mode is changed as shown in FIGS. 8 (e), (f) and (g).

Since phase shift occurs in each sector block 35 in response to leftward and rightward expansion or contraction from its center bore 40, the first metallic member 49 and the second metallic member 53 are both flexed axially and circumferentially, so that the vibrations in such two directions are combined mutually with a phase difference of 90° to consequently produce a composite resonant vibration on the output end 55.

In this embodiment, the groove 46 is formed to be sufficiently wide so as to achieve the function of an amplitude extending horn in both axial and flexual vibrations.

Subsequently, the driving voltages applied to the lead terminals 59 and 60 are phase-inverted with a phase difference of 180° and are adjusted to obtain a flexural resonance frequency close to the axial resonance frequency. Then the output end 55 is so driven as to generate linear resonant vibration in the circumferential direction as shown in FIG. 8(j).

When the phase of the voltage being applied to the lead terminal 59 is advanced or lagged with respect to the lead terminal 60, the vibration mode is changed to a circumferentially elongate counterclockwise elliptic one as shown in FIG. 8(i) or to a circumferentially elongate clockwise elliptic one as shown in FIG. 8(k). And in accordance with further increase of the phase difference, the vibration mode is changed to FIG. 8(h) or (l).

In order to change the ellipticity of the elliptic vibration to a great extent, it is preferred that the axial response frequency and the flexural resonance frequency be as close to each other as possible in view of the structure.

By controlling the relative amplitude of the driving voltages applied to the lead terminals 59 and 60, it becomes possible to change the angle of inclination from the axial or circumferential linear vibration. And a combination of such amplitude control with relative phase control enables generation of elliptic vibration which has an angle of inclination to the axial or circumferential direction, whereby a variety of vibration modes are attainable.

The vibration of the output end 55 thus controlled is transmitted to the rotor 22, which is thereby rotated clockwise or counterclockwise at a desired speed. In this stage, the rotor 22 is drivable in both forward and reverse rotational directions by the single ultrasonic vibrator 26, and the ellipticity is also rendered controllable. As a result, the abrasion in the surface of contact with the rotor 22 is minimized to enable driving in an optimal contact state.

When the frequency of the oscillator 61 is adjusted to the axial resonance point while the displacement of the phase shifter 64 is set to zero, the output end 55 generates axially linear vibration in the manner described previously and as shown in FIG. 8(d), so that the rotor 22 being pressed against the output end 55 is kept in a still state but momentary separation thereof is repeated due to the vibration of an ultrasonic frequency, whereby the shaft 23 is rendered rotatable externally with relative facility.

Although a single oscillator 61 is employed in this embodiment, the circuit configuration may be modified to a vibration feedback type by detection of the vibration speed of the ultrasonic vibrator 26 or to an automatic resonance-frequency tracking type with a phase-locked loop (PLL).

Figure 11:
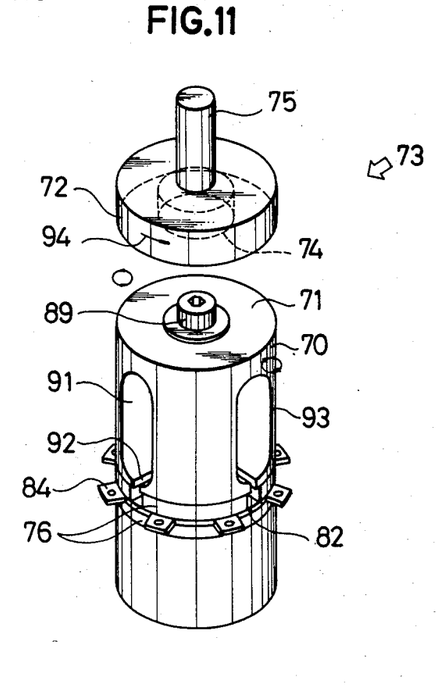
FIG. 11 is an exploded perspective view of a second embodiment according to the invention.

Hereinafter a second exemplary embodiment of the present invention will be described with reference to FIGS. 11 through 17. An ultrasonic vibrator 70 is provided as shown in FIG. 11, and a disk 72 functioning as a rotor is kept in pressed contact with an output end 71 of the ultrasonic vibrator 70, thereby constituting an ultrasonic motor 73. A counter bore 74 is formed at the center of the disk 72 on its one side in contact with the output end 71, and a shaft 75 is formed at the center on the other side. FIG. 11 is a perspective view illustrating merely the principle of operation with omission of mechanical components such as bearings, pressure means and so forth.

Figure 12:
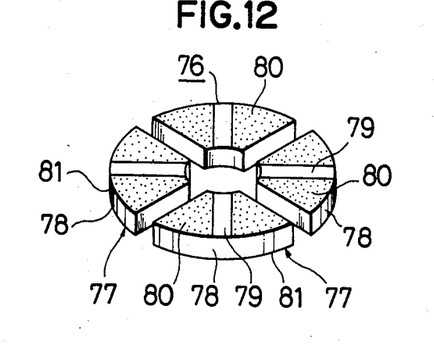
FIG. 12 is a perspective view of an electrostrictive element.

The detail of the ultrasonic vibrator 70 will now be described below. First, FIG. 12 shows an electrostrictive element 76 where four electrode pairs 77 are arrayed annularly in the circumferential direction. Each electrode pair 77 consists of an electrode 80, which is divided into two by an insulator 79 on one side of each electrostrictive piece 78 polarized in the direction of its thickness, and a common electrode 81 formed on the other side thereof.

Figure 13:
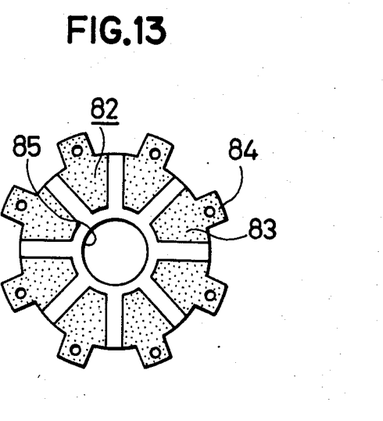
FIG. 13 is a plan view of an electrode.

In FIG. 13 is shown an electrode plate 82, where electrode regions 83 are formed at positions corresponding to the individual electrodes 80 of the electrostrictive element 76, and terminals 84 are formed on the electrode regions 83 respectively. The electrode plate 82 is a printed circuit board composed of a thin glass epoxy plate having an opening 85 at its center and copper foil stuck to the two surfaces thereof.

Figure 14:
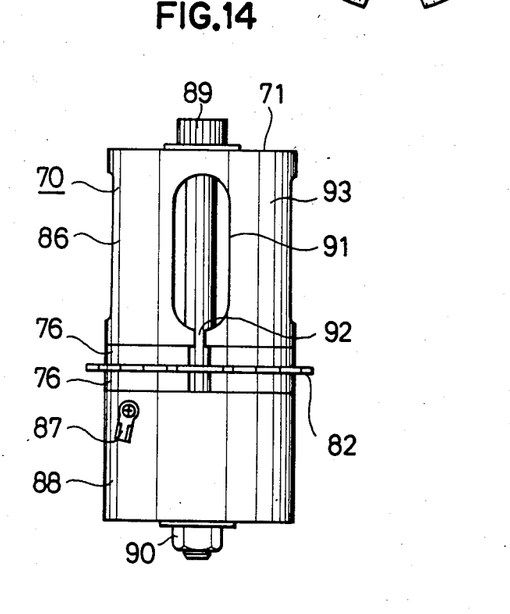
FIG. 14 is a side view of an ultrasonic vibrator.

The aforesaid electrostrictive elements 76 are joined to the two surfaces of the electrode plate 82, and a vibratory element 86 composed of a metallic member is connected to one electrostrictive element 76 while another vibratory element 88 having a common terminal 87 is connected to the other electrostrictive element 76. Such electrostrictive element 76 and vibratory elements 86, 88 are clamped together integrally by means of conductive bolts 89 and nuts 90 piercing through the respective centers. As for the detail of the vibratory element 86, its one end face serves as an output end 71, and wide grooves 91 and narrow grooves 92 extend toward the other end face. Legs 93 equal in number to the aforesaid electrode pairs 77 are formed by such grooves 91 and 92. And the respective end faces of the legs 93 are joined to common electrodes 81 of the electrode pairs 77.

The electrodes 80 of the electrode pairs 77 are connected in parallel to the electrodes 80 of the electrostrictive element 76 with mutual positional coincidence in the circumferential direction, and an unshown driving circuit is connected via the terminals 84 and the common terminals 87.

Figure 15:
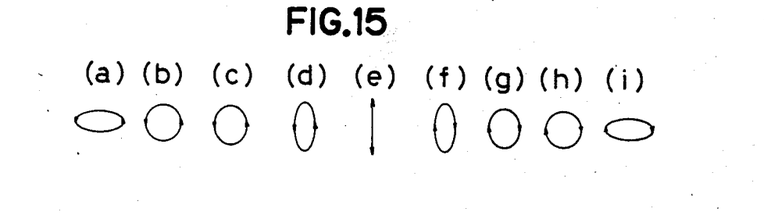
FIG. 15 illustrates exemplary modes of vibration of an output end.
Figure 16:
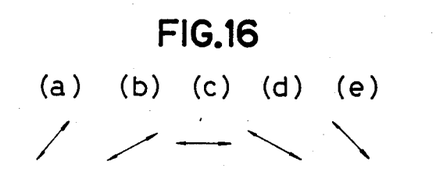
FIG. 16 illustrates other exemplary modes of vibration of the output end.

In the constitution mentioned above, the relation between the voltage applied to the ultrasonic vibrator 70 and the vibration mode at the output end 71 is the same as in the first embodiment. Accordingly, when the driving voltages are so controlled as to vibrate the output end 71 in a mode of FIG. 15(i), the disk 72 is rotated on the shaft 75 in the direction indicated by an arrow 94. And if the relative phase is so controlled as to obtain a vibration mode of FIG. 15(f), the rotation speed is lowered. Meanwhile, when the driving voltages are adjusted to have an in-phase relation, the vibration is effected merely in the axial direction as shown in FIG. 15(e) and is brought to a still state. And in accordance with further increase of the phase in the reverse direction, the disk 72 is rotated at a higher speed in the direction reverse to the arrow 94.

In the ultrasonic vibrator 70, other vibration modes such as those shown in FIGS. 16(a) through (e) are also attainable by controlling the relative amplitude of the driving voltages synchronized with the flexural resonance frequency.

The electrode plate 82 employed in the above embodiment is a printed circuit board composed of a thin glass epoxy plate. Practically, however, the electrodes may be formed on an insulator base plate of ceramics or the like by the art of evaporation, plating or printing.

It is also possible to assemble the entire structure by the use of a single electrostrictive element 76 with an electrode plate 82 having electrode regions 83 merely on its one surface.

Furthermore, the vibratory element 86 and the metallic member 86 should preferably be so shaped that the respective resonance frequencies are close to each other for extension of the axial and flexural vibration amplitudes.

Figure 17:
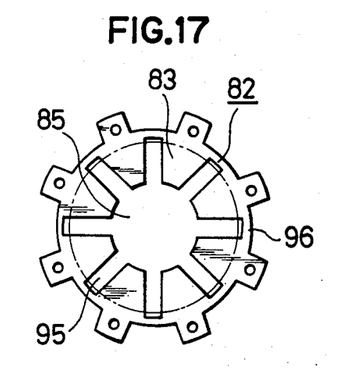
FIG. 17 is a plan view of a modified electrode plate.

FIG. 17 shows an exemplary modification of the electrode plate 82. Its diameter is altered to be greater than that of the electrostrictive element 76, and eight grooves 95 extend radially from a center opening 85. And after assembly, joints 96 in the peripheries of the grooves 95 are cut off to form independent electrode regions 83.

Figure 18:
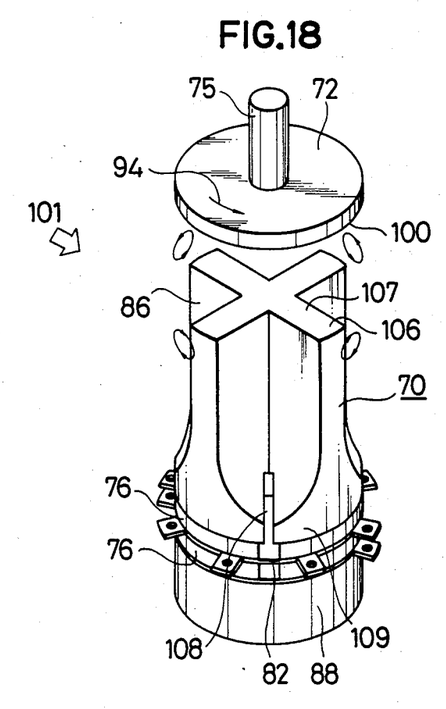
FIG. 18 is a perspective view of a third embodiment according to the invention.
Figure 19:
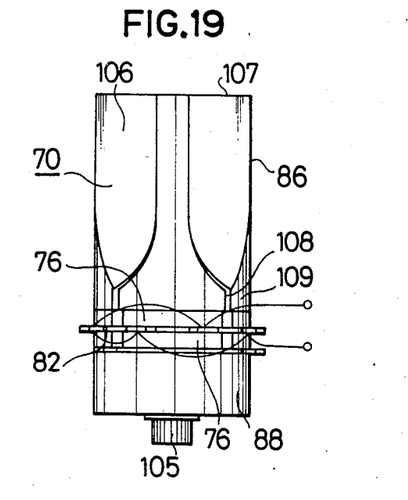
FIG. 19 is a side view of an ultrasonic vibrator.
Figure 20:
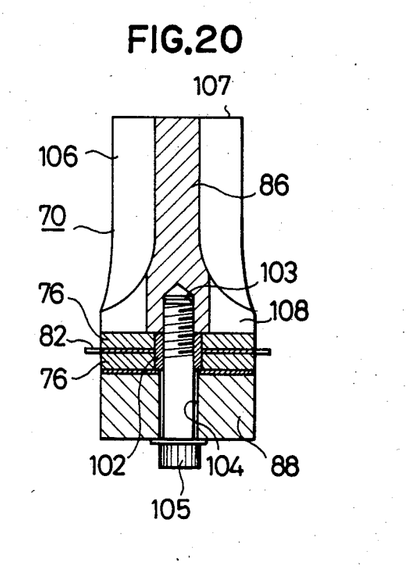
FIG. 20 is a vertical sectional side view of the vibrator shown in FIG. 19.

Now a third embodiment of the present invention will be described below with reference to FIGS. 18 through 20. The same components as those used in the second embodiment are denoted by the same reference numerals, and a repeated explanation is omitted here. The aforesaid counter bore 74 is not formed in a rotor 72, and an output end 107 of an ultrasonic vibrator 70 is pressed against a surface 100 to constitute an ultrasonic motor 101. As for the detail of the ultrasonic vibrator 70, an insulator cylinder 102 is inserted into the central portions of both the electrostrictive element 76 and the electrode plate 82. A threaded portion 103 is formed in the vibratory element 86 at a position coincident with the insulator cylinder 102, while a bolt hole 104 is formed in the metallic member 88, and a bolt 105 serving as a clamping tool and piercing through the bolt hole 104 is screwed into the threaded portion 103, whereby the entire components are clamped together integrally. The vibratory element 86 is so shaped as to have a cross-like output end 107 where four contact legs 106 are radially formed, and at the other end reverse to the output end 107, there are formed cross-like slits 108 extending radially with an angular deviation of 45° from the output end 107. And legs 109 are defined by such slits 108.

In the structure mentioned above, the extension ratio of the flexural vibration amplitude is great, so that the rotor can be driven at a high rotation rate.

It is to be understood that some other embodiments than those described hereinabove and a variety of modifications as well as combinations thereof may be contrived within the scope of the inventive conception defined in the appended claims.

What is claimed is:

1. A rotary ultrasonic motor comprising an ultrasonic vibrator with an electrostrictive element which is polarized in the direction of its thickness and has a plurality of electrode pairs arrayed at equal intervals in the circumferential direction, said electrostrictive element being held and clamped between two metallic members in which grooves are formed with the exception of end regions thereof along division lines corresponding in number to said electrode pairs of said electrostrictive element, wherein an intermediate portion of said ultrasonic vibrator is anchored to a frame, and a rotor kept in pressed contact with the output end of said ultrasonic vibrator is rotatably attached to said frame, said rotor having an output shaft at the center of rotation thereof.

2. The motor as defined in claim 1, wherein said metallic members are shaped to be cylindrical.

3. The motor as defined in claim 2, wherein the output end of each metallic member is shaped into a ring.

4. The motor as defined in claim 1, wherein grooves are formed in both of said metallic members.

5. The motor as defined in claim 1, wherein the output end of said metallic member is shaped into a cross having an angular deviation of 45° from the whole shape of four cross-like grooves formed at equal intervals.

* * * * *